Patented Apr. 26, 1949

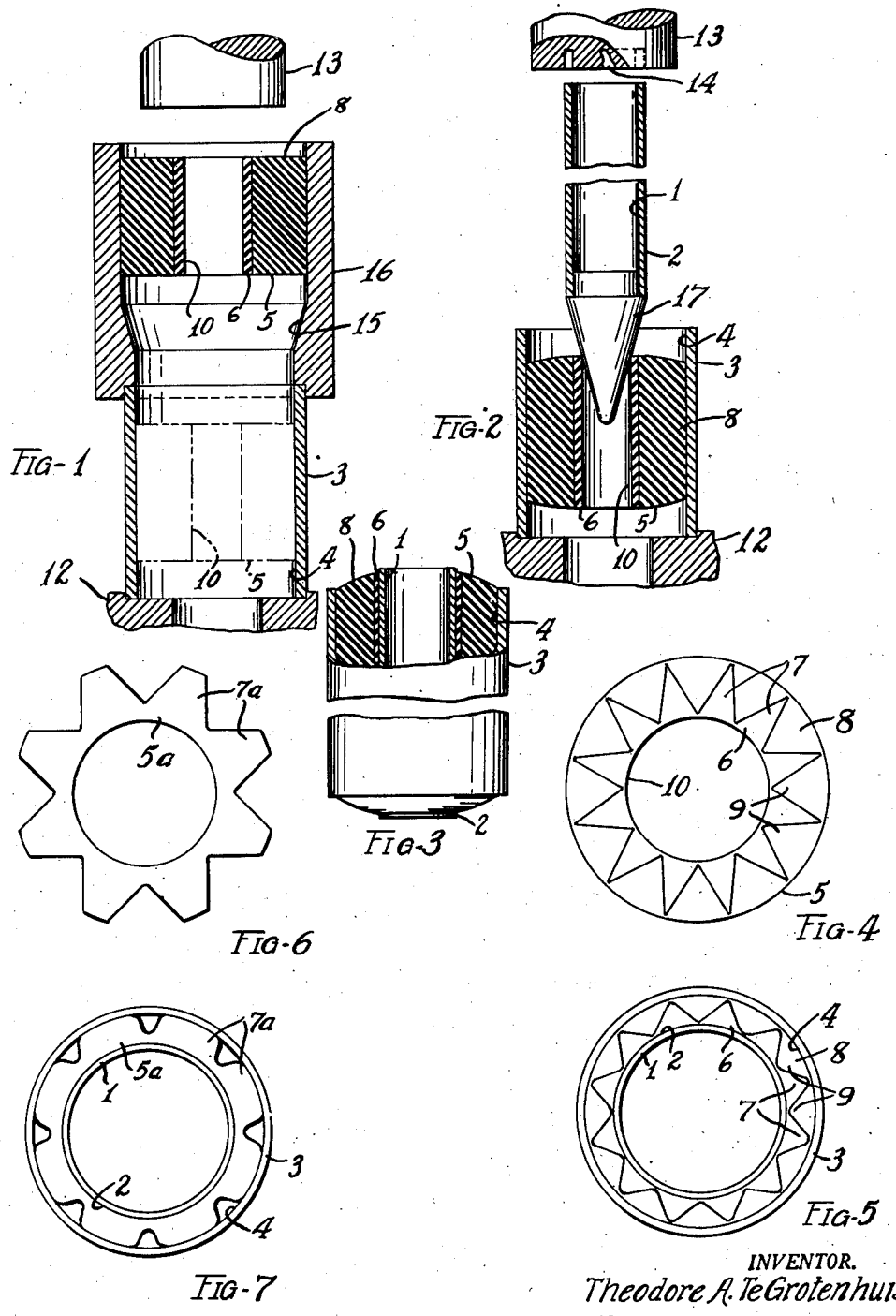

2,468,311

UNITED STATES PATENT OFFICE 2,468,311

RESILIENT CONNECTION

Theodore A. Te Grotenhuis, Olmsted Falls, Ohio, assignor to The General Tire & Rubber Company, Akron, Ohio, a corporation of Ohio Application January 11, 1946, Serial No. 640,421

10 Claims. (Cl. 287—85)

This invention relates to antivibration mountings and torsional joints, and to a method of making the same. It particularly relates to an improvement in joints and mountings having two annularly spaced telescoping rigid sleeves spaced apart by a rubber held under a state of substantial radial compression or longitudinal tension between the metal members.

In the Patent 1,782,770 of Leon F. Thiry, there is disclosed a resilient connection comprising coaxial cylindrical elements spaced apart and connected by an annular rubber tube, which in its original unstressed condition has a radial thickness greater than the width of the annular space between the cylindrical coaxial elements. In such a resilient connection, as in other mountings or joints having the inner and outer coaxial members connected by rubber in a normal molded state, all the torsional and longitudinal stress interposed between the two rigid members must be transmitted through the theoretical successive tubular layers of rubber having different diameter and different areas, which collectively make up the resilient material between the coaxial members. The surface of the resilient member adjacent the outer cylindrical surface of the inner rigid coaxial element is of relatively small diameter and relatively small area compared to the surface of the resilient member in contact with the outer coaxial element. As the resistance to shear or the rigidity of the various theoretical tubular layers of which the rubber member is composed is directly proportional to the surface area thereof and as the surface area becomes greater as the diameter of the tubular layer becomes greater, it is seen that the tendency for shear distortion or flexing of the rubber in the region adjacent the inner member is far greater than the tendency for distortion adjacent the outer rigid tube when stresses are applied, tending to move one of the coaxial members relative to the other.

In commercial practice, the difference between the relative ease of deflection of that portion of the rubber in the region adjacent the inner coaxial element and that portion adjacent the outer tubular element is so great that most of the relative movement of the inner and outer coaxial members is accomplished by distortion of only that portion of the rubber closely adjacent the inner coaxial tubular elements. The result is that only a small portion of the resilient material of the joint or pivotal connection is utilized efficiently and if failure of the joint or connection is to be avoided, the degree of deflection of the joint or the amount of relative movement of the rigid coaxial members must usually be held to a relatively low value, particularly when the periodicity of the deflections is such that considerable energy is absorbed by the rubber. This is the case whether the rubber is under radial compression or whether it is merely molded in place and bonded by surface adhesion in a conventional manner to the inner and outer coaxial members.

In order to overcome the difficulty due to the concentrated absorption of energy in only a relatively small portion of the rubber between the coaxial members, it has been proposed as illustrated in French Patent 784,089 of M. L. Thiry, to substitute for the homogeneous cylindrical rubber member ordinarily used, a rubber member made up of a plurality of concentric contacting sleeves of rubber compounds having different hardness and arranged so that the harder rubber sleeve is in contact with the inner coaxial metal member of the joint and the softer rubber sleeve is in contact with the outer element of the joint. Tubes or sleeves of rubber between the innermost and outermost tubes are of intermediate hardness and progressively become softer as the diameter of the tubes increase.

In a mounting or joint of the type just described, in order to obtain the optimum result with such a construction, an infinite number of concentric tubes of gradually decreasing hardness with increasing diameter is required. Merely constructing the rubber element of the joint by superimposing two or even three different types of tubular rubber elements of progressively decreasing hardness does not give the most desirable result as concentrations of stress occurs at the sharp dividing line between successive tubular elements of different hardness.

It is an object of the present invention to provide a torsional joint having inner and outer substantially coaxial elements connected by a rubber member, in which the rubber elements may be made up of only two or three stocks of different hardness, yet which gives substantially the effect of a mounting in which the elements are separated by a rubber element composed of an infinite number of concentric tubes having decreasing hardness with increasing diameter.

It is another object of the present invention to provide a method of making joints and mountings in which greater periodical deflections may be had between the inner and outer coaxial members.

A further object of the present invention is to provide a joint or mounting having two coaxial rigid members separated by a cylindrical rubber member, but which is relatively inexpensive to produce and which is capable of absorbing greater energy due to torsional and longitudinal deflection than mountings heretofore commercially available.

Other objects will be apparent from the following description of the invention as illustrated by the accompanying drawings, in which:

Figure 1 is a longitudinal view partly in section through some of the joint elements and portions of suitable apparatus for assembling mountings of the present invention, showing in full lines the rubber element about to be inserted within the outer sleeve and showing in broken lines its position within the outer sleeve just prior to assembly of the inner rigid coaxial joint element.

Fig. 2 is a vertical sectional view through the elements of my improved joint, showing a portion of the apparatus used for forcing the inner coaxial elements within the opening of the tubular rubber elements while they are disposed within the outer rigid coaxial element;

Fig. 3 is an elevational view, with parts broken away, of a mounting embodying the present invention;

Fig. 4 is a plan or end view of a rubber element of a joint embodying the present invention;

Fig. 5 is a plan or end view of a mounting or joint embodying the present invention;

Fig. 6 is an end or plan view of the rubber element of a modified form of mounting embodying the present invention, and Fig. 7 is an end view of a modified form of mounting or joint embodying the present invention and utilizing the rubber element illustrated in Fig. 6.

Referring more particularly to the drawings, in which like parts are indicated by like numerals of reference throughout the several views, it is seen that the joints of the present invention comprise an inner rigid element which may be the tubular member 1 which preferably has an outer, generally cylindrical surface 2. An outer rigid element 3, which is generally tubular and has an inner, generally cylindrical surface 4, surrounds and is coaxial with the outer surface 2 of the inner element. An annular deformable member 5 of rubberlike material, or at least a substantial portion thereof, is disposed in the annular space between the inner and outer rigid coaxial members, and operates to connect these members resiliently so that they are relatively movable only when the deformable member 5 is subjected to a change in deformation.

In accordance with the preferred form of the present invention, the annular rubber member 5 is composed of at least two rubber compounds having different stiffness or hardness. Each of the rubber compounds forms an annulus concentric with that formed from the other compounds. The inner annulus 6 composed of the relatively hard rubber compound, is circumferentially indented to provide a plurality of teeth 7 which are preferably triangularly shaped, extend substantially throughout the thickness of the annulus 6 and are regularly spaced. The inner surface of the outer annulus 8, which is of softer material than the annulus 6, is circumferentially indented to provide a plurality of inwardly extending teeth 9 also preferably triangularly shaped and regularly spaced, which teeth are complementary to the outwardly extending teeth 7. The composite annulus 5, therefore, is composed essentially of complementary inwardly and outwardly extending teeth which preferably have a length about equal to the distance between the inner and outer rigid coaxial members and which solidly bear against each other. The annulus 5 is solid and it has inner and outer cylindrical surfaces. The teeth or annuli of different hardness may be vulcanized together, or the annuli may merely be held together by the deforming pressure.

By providing the teeth with inclined surfaces the outwardly extending teeth 7 of the harder member are tapered or are of decreasing width as they approach the inner cylindrical surface 4 of the outer coaxial rigid member.

If one, for the purposes of analysis, will consider the bushing 5 to be made up of an infinite number of concentric contacting tubes of infinitesimal thickness, it will be seen that since the resistance to shear or the rigidity of each of these tubes is made up of the sum of the rigidities of those portions of the teeth 7 and 9 within them, the rigidities of the tubes may be maintained uniform, or may even be made to decrease with increasing diameter provided the hardness of the compound comprising the outwardly extending teeth 7 is sufficiently greater than the hardness of the compound of which the inwardly extending teeth 7 is composed.

In assembling the form of the bushing of the present invention wherein the annular resilient member 5 is under a state of radial compression, use may be made of a suitable press having a platen 12 and a plunger 13 optionally movable toward and away from each other and capable of exerting substantial pressure on elements inserted between them. The annular resilient member 5 may be forced through a tapered path 15 within the mounting member 16 to radially compress it so that its outer diameter corresponds to the diameter of the inner surface 4 of the outer rigid coaxial member 3.

The inner surface 10 of the bushing or annular member 5 is preferably compressed during this operation to a smaller diameter, which diameter is substantially smaller than the diameter of the outer surface of the inner rigid coaxial member 1. The inner coaxial rigid member 1 may be carried on a suitable tip 14 of the member 13. The leading end of the inner member 1 is provided with a tapered leader 17 and forced at high speed through the opening 10 of the resilient member to cause the resilient member 5 to be compressed radially between the coaxial members 1 and 3, as shown in Fig. 3 and in enlarged scale in Fig. 5.

Suitable surface adhesion may or may not be provided between the outer surface 2 of the inner rigid member 1 and the inner surface of the cylindrical surface 10 of the resilient member. Similarly, surface adhesion may or may not be provided between the inner surface 4 of the outer member and the outer surface of the resilient member 5. However, as illustrated, the compression of the rubber usually provides sufficient surface friction so that the inner and outer coaxial members may not be moved relative to each other except through distortion of the rubber annulus.

If chemical bonding is desirable between the rubber and metal surfaces 2 and 4 they may be coated with a dried film deposited thereon from a hard drying material such as a solution of rubber chloride, a rubber isomer or rubber derivatives capable of passing through the thermoplastic state or other rubber to metal adhesive prior to the placing of the rubber annulus. The adhesion is obtained to the vulcanized bushing 5 by simply heating the metal parts of the assembled bushing rapidly to the softening point of the adhesive. In case the bushing 5 is vulcanized and placed between the coaxial members so that it is not under a state of compression, the adhesion is obtained during vulcanization by any one of the conventional methods of bonding rubber to metal.

In the modification shown in Figs. 6 and 7, the annular rubber bushing is prepared from a single rubber compound 5a and consists largely of a plurality of regularly spaced teeth 7a which are united together at their base and extend outwardly substantially throughout the depth of the bushing. The bushing 5a may also be considered to be circumferentially indented with regularly spaced indentations which extend substantially through the major portion of the bushing. When the bushing 5a is assembled between the inner and outer members in the same manner as the above described bushing 5, it is seen that the rigidity of the bushing may be somewhat less in the regions of greater diameter than in the regions of smaller diameter.

The joints of connection involving the coaxial members connected together by the bushing 5a are relatively highly flexible and may have relatively low resistance to distortion. It is preferred that the bushing 5a be united to the contacting metal members by surface adhesion through a suitable rubber-to-metal adhesive.

The teeth 7a, not being supported by complementary teeth of a softer rubber compound as in the other modifications shown, must have a height to mean width ratio sufficient to prevent bending when the mounting is assembled, if they are to be radially compressed as shown. A height to width ratio of less than two is desirous.

It will be seen from the above that particularly when the outwardly extending teeth are triangular in form or tapered, the stiffness of the increasing section of the teeth 7 may be controlled to just counteract the decreasing area of rubber through which the torsional forces are transmitted as the surface 2 of the inner rigid member 1 is approached.

The composite bushing 5 may be manufactured in any desirable way, as by superimposing the softer rubber compound upon the harder rubber compound in the tubing operation, whereupon they are vulcanized together as shown in Fig. 4.

If desirable, the teeth 7, or the annular member 6 composed largely of the teeth 7, may be separately molded and cured, and the outer annular member composed of the teeth 9 may be separately cured and the bushing formed by assembling the components with or without the use of a suitable cement at their contacting surfaces.

It is also apparent that many modifications of the invention may be made without changing the spirit thereof, and it is intended that the invention be limited only by the appended claims.

What I claim is:

1. An anti-vibration mounting or pivotal connection comprising inner and outer rigid coaxial members, an annular bushing of a rubber compound in the annular space between said coaxial members and bearing against an inner surface of the outer coaxial member and outer surface of the inner coaxial member, the outer surface of said bushing being circumferentially indented to provide a plurality of spaced solid teeth which extend substantially throughout the thickness of the bushing, said teeth being widest at their base portion adjacent said inner coaxial member, narrowest adjacent the inner surface of said outer coaxial member, and gradually diminishing in width as they extend outwardly from said base portion 2. A pivotal joint connection according to claim 1, in which the bushing is radially compressed between said coaxial members.

3. A mounting or joint comprising inner and outer coaxial members, an annulus of soft, vulcanized rubber-like materials in the annular space between the said coaxial members and connecting said coaxial members together so that said coaxial members are relatively movable through distortion of said annulus of rubber-like material, said annulus comprising a plurality of outwardly extending teeth annularly arranged and substantially connected at their base, and a plurality of inwardly extending teeth disposed between said outwardly extending teeth and also substantially connected at their base to form a substantially solid annulus, said outwardly extending teeth being composed of a harder vulcanized soft rubber compound than said inwardly extending teeth.

4. A mounting or joint comprising inner and outer coaxial members, a bushing in the annular space between the said coaxial members and connecting said coaxial members together so that said coaxial members are relatively movable through distortion of said bushing of rubber-like material, said bushing comprising a plurality of outwardly extending teeth annularly arranged and substantially connected at their base, and a plurality of inwardly extending teeth disposed between said outwardly extending teeth and also substantially connected at their base to form a substantially solid annulus having inner and outer cylindrical walls, said outwardly extending teeth being composed of a harder rubber compound than said inwardly extending teeth.

5. A mounting or joint comprising inner and outer coaxial members, a bushing in the annular space between the said coaxial members and connecting said coaxial members together so that said coaxial members are relatively movable through distortion of said bushing of rubber-like material, said bushing comprising an inner annulus having its outer circumferential surface indented to provide a plurality of regularly spaced teeth united together at their base, and an outer annulus having its inner surface circumferentially indented to provide a plurality of regularly spaced teeth which are disposed complementary with the teeth of said inner annulus to form a solid annular structure, said inner annulus being composed of a relatively stiffer rubber compound than the rubber compound of the outer annulus.

6. A mounting or joint comprising inner and outer coaxial members, a bushing in the annular space between the said coaxial members and connecting said coaxial members together so that said coaxial members are relatively movable through distortion of said bushing of rubber-like material, said bushing comprising an inner annulus having its outer circumferential surface indented to provide a plurality of regularly spaced teeth united together at their base, and an outer annulus having its inner surface circumferentially indented to provide a plurality of regularly spaced teeth which are disposed complementary with the teeth of said inner annulus to form a solid annular structure, said inner annulus being of a rubber compound having a greater resistance to deformation than the rubber compound of said outer annulus.

7. The mounting according to claim 5, in which the composite annulus is maintained under a state of radial compression by said inner and outer rigid members.

8. The mounting according to claim 5, in which the composite annulus is bonded by surface adhesion to said inner and outer coaxial rigid members and is also under a state of radial compression.

9. The mounting of claim 4 where the composite annulus is bonded to the outer surface of the inner coaxial rigid member.

10. A mounting or pivotal connection comprising inner and outer rigid coaxial members and an annular bushing of a rubber-like compound in the annular space between said coaxial members and bearing against the inner surface of the outer coaxial member and against the outer surface of the inner coaxial member, said bushing comprising an annulus of vulcanized soft rubber-like compound having its outer circumferential surface indented to provide a plurality of regularly spaced solid tapered teeth united together at their base and extending substantially throughout the thickness of the bushing, said teeth being widest at their base adjacent said inner coaxial member and widest at their apex adjacent the inner surface of said outer coaxial member.

THEODORE A. TE GROTENHUIS.

REFERENCES CITED

The following references are of record in the file of this patent:

UNITED STATES PATENTS

| Number | Name | Date |
| --- | --- | --- |
| 1,555,214 | Johnson | Sept. 29, 1925 |
| 1,758,659 | Flury | May 13, 1930 |
| 1,794,926 | Short | Mar. 3, 1931 |
| 1,879,287 | Johnson | Sept. 27, 1932 |
| 1,959,256 | Zerk | May 15, 1934 |
| 2,066,187 | Piron | Dec. 29, 1936 |
| 2,256,752 | Saurer | Sept. 23, 1941 |
| 2,259,460 | Dexter | Oct. 21, 1941 |
| 2,379,508 | Dodge | July 3, 1945 |

FOREIGN PATENTS

| Number | Country | Date |
| --- | --- | --- |
| 462,542 | Great Britain | Mar. 10, 1937 |
| 698,771 | Germany | Nov. 16, 1940 |